A. RUEBSAMEN AND W. L. DENNIS.
FARE COLLECTING BOX.
APPLICATION FILED MAR. 13, 1919.
1,394,941. Patented Oct. 25, 1921.
3 SHEETS—SHEET 2.
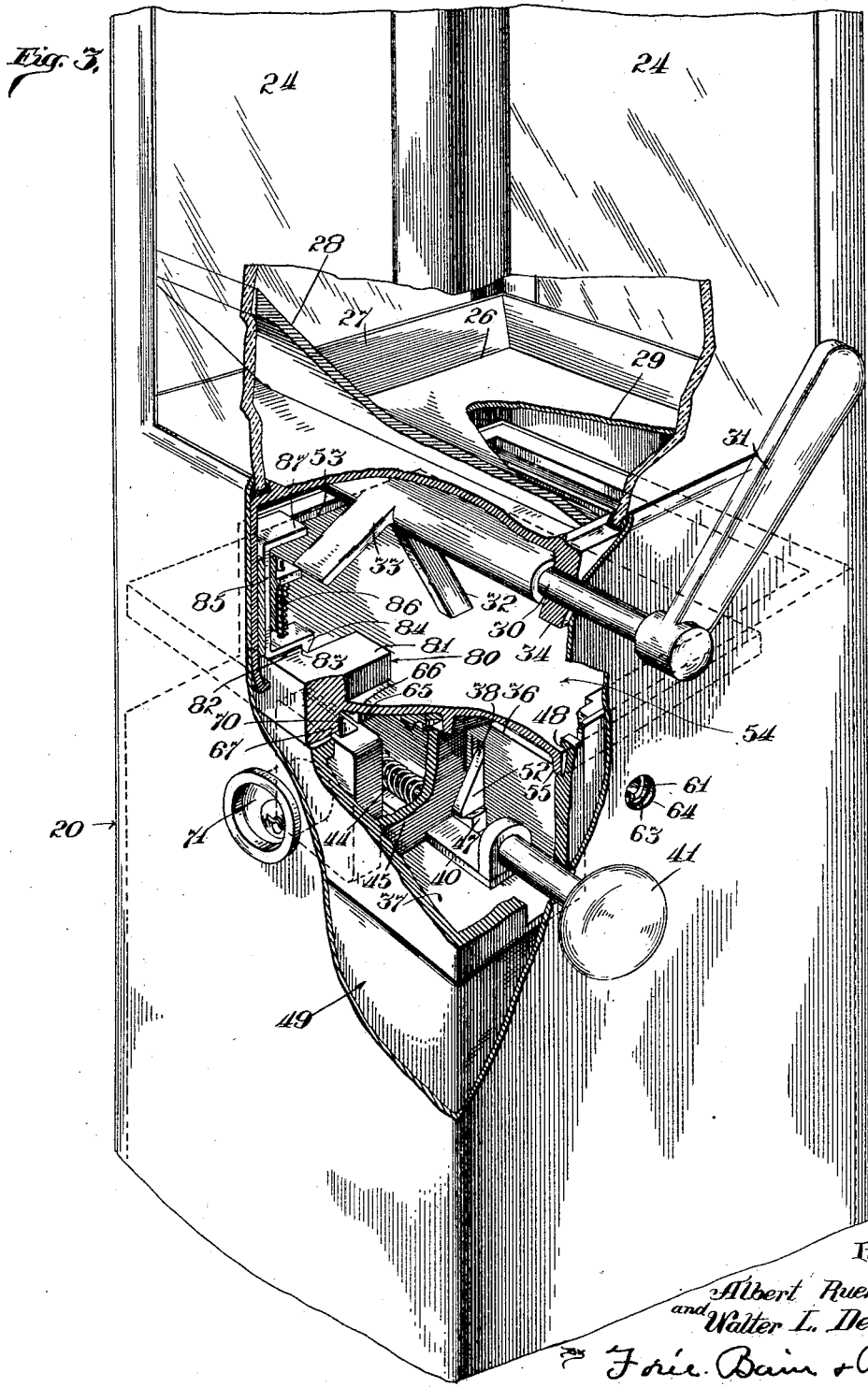

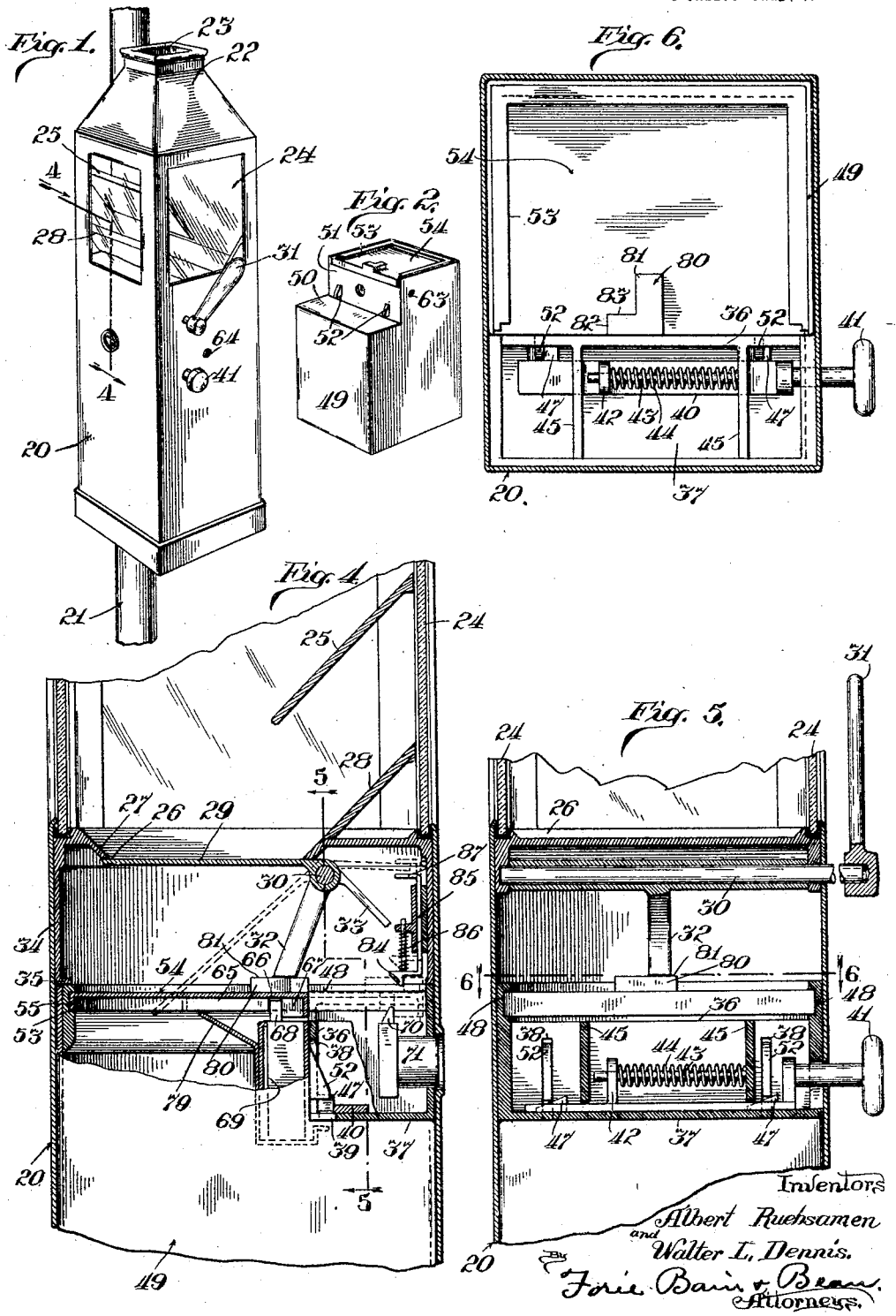

A. RUEBSAMEN AND W. L. DENNIS.
FARE COLLECTING BOX.
APPLICATION FILED MAR. 13, 1919.
1,394,941.
Patented Oct. 25, 1921.
3 SHEETS—SHEET 3.
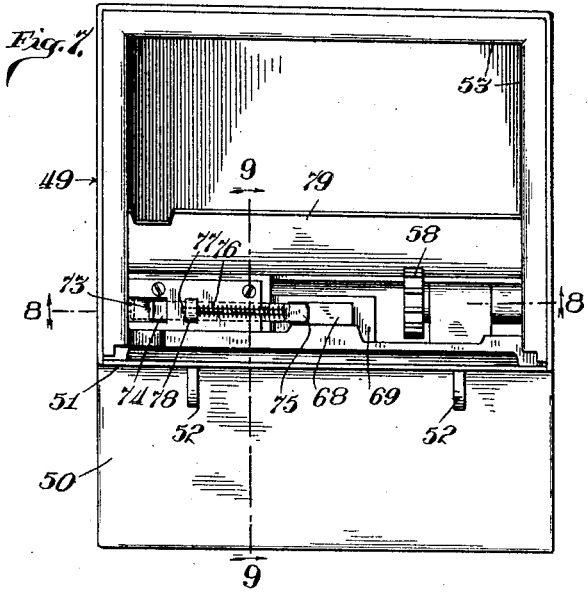
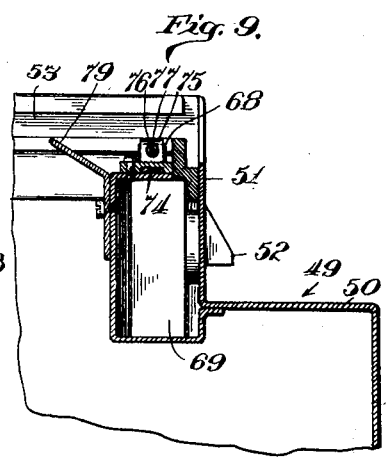
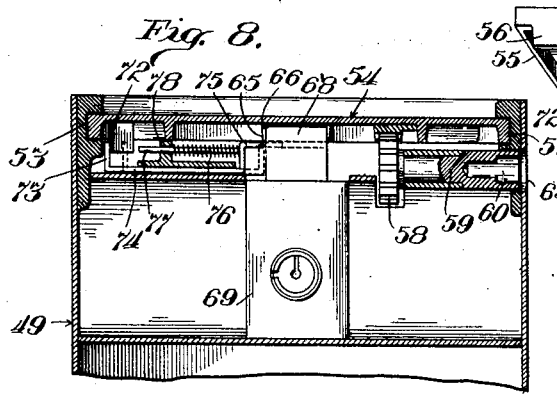
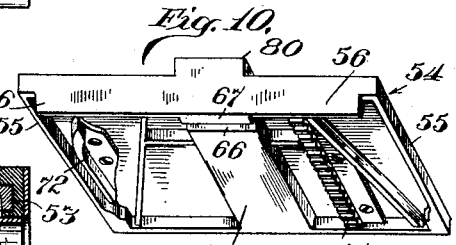
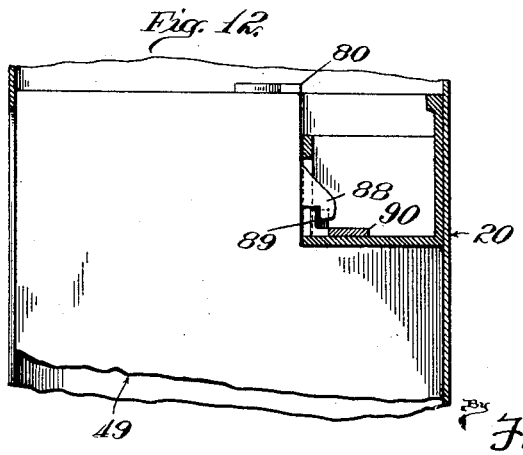
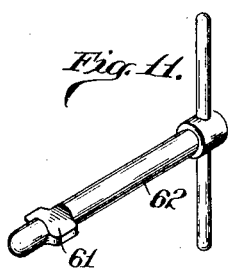
Inventors
Albert Ruebsamen
and Walter L. Dennis.
By Foree Bain & Bean
Attorneys.

UNITED STATES PATENT OFFICE.

ALBERT RUEBSAMEN AND WALTER L. DENNIS, OF DECATUR, ILLINOIS, ASSIGNORS TO ALBERT RUEBSAMEN, WALTER L. DENNIS, AND MOSES W. RANDOLPH, A COPARTNERSHIP DOING BUSINESS UNDER THE NAME OF THE R. D. R. MANUFACTURING CO., OF DECATUR, ILLINOIS.

FARE-COLLECTING BOX.

1,394,941.   Specification of Letters Patent.   Patented Oct. 25, 1921.

Application filed March 13, 1919. Serial No. 282,307.

*To all whom it may concern:*

Be it known that we, ALBERT RUEBSAMEN and WALTER L. DENNIS, citizens of the United States, respectively, residing at Decatur, in the county of Macon and State of Illinois, and at Decatur, in the county of Macon and State of Illinois, have invented certain new and useful Improvements in Fare-Collecting Boxes, of which the following is a specification.

This invention relates to improvements in coin, ticket, fare or other article collecting devices having a till or other article receptacle which is adapted to be removed from a main body or casing by certain authorized parties and which parties are the only ones who have access to the receptacle or till.

The principal object of this invention is the provision of such a device which includes a main body or casing and a removable coin or other article receptacle or till, the main body or casing having a dumping plate or tray, means being provided whereby the receptacle or till cannot be removed from the main body or casing unless the sliding cover or lid thereof is in closed and locked position and can only be removed from the casing after the lid or tray has been dumped to discharge any articles which may be resting thereon.

A further object of this invention is the provision of a removable receptacle or till in combination with a main body or casing, said receptacle or till having a sliding lid or cover and means for locking the lid or cover in closed position, said body or casing being provided with means for locking the cover or lid of the receptacle or till in open position, certain of said means being key operated and the other of said means being automatically operated by the dumping of the lid or tray in the main body or casing, whereby the lid or cover of the receptacle or till cannot be moved to closed position until the key actuated means is operated and until the lid or tray is moved to extreme dumping position to release the locking means.

A further object of this invention is the provision of a removable receptacle or till adapted to be inserted in the main body or casing, said receptacle or till having a sliding lid or cover provided with a rack on the under side thereof, a pinion for engaging said rack to move said lid or cover and means for rotating said pinion, and key actuated locking means for holding said lid or cover in a closed position and key actuated locking means for holding said lid or cover in an open position, whereby said lid or cover may not be moved to either open or closed position unless said key actuated locking means are released.

Various other objects of this invention include improvements of details of construction and arrangement, whereby a simple and effectively operated mechanism of the character described is provided, which is strong in construction and to which access may not be had by unauthorized parties, absolute security being the main and essential feature.

To the accomplishment of the foregoing and such other objects as may hereinafter appear, our invention consists in the construction, combination and arrangement of parts hereinafter described, and then sought to be defined in the appended claims, reference being had to the accompanying drawings forming a part hereof, and which show, merely for the purpose of illustrative disclosure, a preferred embodiment of my invention, it being expressly understood that various changes may be made in practice within the scope of the claims without digressing from our inventive idea.

Figure 1 represents a perspective view of a device constructed to embody our invention mounted in position.

Fig. 2 is a perspective view of the article receiving receptacle or till removed from the box.

Fig. 3 is an enlarged perspective of the device, the article receiving receptacle or till being shown in position and in condition to receive coins or other articles deposited in the box, various parts of this view being broken away and shown in section to facilitate the disclosure.

Fig. 4 is a vertical cross section through part of the box and upper part of the article receiving receptacle or till taken substantially on line 4—4 of Fig. 1 showing the lid of the coin receiving receptacle or till in position assumed before the article receiving receptacle or till can be removed from the box.

Fig. 5 is a vertical transverse section taken substantially on line 5—5 of Fig. 4.

Fig. 6 is a sectional view of the article receiving receptacle or till in position in the box and part of this box as the same would appear, looking down on section line 6—6 of Fig. 5.

Fig. 7 is a top plan view of the article receiving receptacle or till, the lid being entirely removed so as to show the operating and locking mechanism therefor.

Fig. 8 is a vertical cross section taken through the top of the article receiving receptable or till, the lid being shown in open position, that is the position shown in Fig. 3, of the drawing, whereby coins or other articles may be deposited in the box and passed into the article receiving receptacle or till.

Fig. 9 is a vertical cross section taken substantially on line 9—9 of Fig. 7.

Fig. 10 is an isometric perspective view showing the bottom of the lid or cover for the coin receiving receptacle or till.

Fig. 11 is a similar view of the operating key for moving the lid of the coin receiving receptacle or till to and from open and closed position.

Fig. 12 is a vertical cross section, illustrating the construction for permitting the till to be inserted from the side of the main body or casing.

Referring now to the drawings, the numeral 20 designates the main casing or body of the receptacle which is adapted to be suitably supported in position on a post or other support 21, by means of brackets, clamps or the like, as is well understood in this art. This casing is preferably of elongated rectangular form, having the restricted receiving part 22 with the opening 23 at the top and having the upper portion 24 preferably provided with glass or other transparent panels and in which is provided a suitable baffle plate 25 which directs the coins or other articles in their proper course and submits them to the observation or vision of the party having supervision over the box.

At the bottom of this hopper portion 24, the interior frame work of the box is formed so as to provide a somewhat restricted opening or passage 26 leading from the hopper to an intermediate part. This opening or passage is provided with downwardly inclined side edge parts 27 and the hopper is provided at one end with a baffle plate 28 leading to the inclined edge at that side. It is this latter inclined edge which is removed some distance from the side of the box so that there is no chance of the coins or other articles passing into that part of the box to interfere with the various operating parts to be hereinafter described.

This opening or passage 26 is adapted to be closed by means of a tray or plate 29, the rear end of which is secured to shaft 30 which is suitably journaled in the frame and has the operating handle 31 on the outside end thereof. This plate or tray 29 is provided with two elongated fingers or projections 32 and 33 which are arranged to assume positions on opposite sides of a vertical line when the tray or plate is in closed position, as shown clearly in Fig. 4 of the drawings. The purpose and function of these parts will be hereinafter described.

The intermediate part of this box or receptacle 20 in which the tray or lid 29 is adapted to operate, is suitably braced and reinforced as shown, as at 34, the lower end of said member terminating in the inturned flange part 35 against which the upper edge of the removable article receiving receptacle or till is adapted to engage at the limit of its upward movement.

We provide a transversely extending vertical partition 36 across this intermediate part of the box or receptacle and also another transverse and horizontal partition 37 which serves to form a comparatively small compartment, rectangular in cross section, in the right hand part of the device, looking at Fig. 4 of the drawings. The vertical partition 36 is provided with openings or apertures 38 while the bottom or horizontal partition 37 is also provided with corresponding openings or apertures 39, the purpose of which will be hereinafter described. Slidably mounted in this compartment is a locking bar member 40 having the operating knob 41 on the outside of the box or receptacle and also having the upstanding lug 42 through which the rod 43 passes, about which rod, coil spring 44 is positioned, one end of coil spring engaging the upstanding flange 42 and the other end of the coil spring engaging one of the transverse partitions 45 in this compartment, so that this locking bar member is normally held in the position illustrated in Figs. 5 and 6 of the drawings. To one side of this bar member and near each end thereof is secured the wedge shaped locking member 47 which is normally adapted to be positioned in the path of movement of a coöperating locking part on the removable article receiving receptacle or till and adapted to be moved out of the way of said locking part when the article receiving receptacle or till is to be removed.

In the upper part of this compartment just described, and along the sides of the box, we provide the guide ways 48 which are in alinement with similar guide ways in the upper part of the article receiving receptacle or till when the same is in operating position within the box and which are adapted to receive the slidable lid of said receptacle or till, as will be presently described.

This removable coin or other article receiving receptacle or till is shown separately in Fig. 2 of the drawing and is designated generally by the reference character 49. It is of substantially cubical shape, having one of its upper corner portions cut out, as at 50, to correspond to the compartment formed within the box or receptacle by means of the partitions 36 and 37, this compartment being adapted to fit in the said cut out part 50 of the receptacle or till when the same is inserted in position within the box. In the vertical wall 51 of the receptacle or till provided by this cut out part 50, we provide the supporting lugs 52 which are adapted to coöperate with the locking wedge members 47 on the locking bar 40, previously described, so that when the receptacle or till is inserted in position it will be properly supported by means of these members 52 resting on the wedge locking members 47 as is well understood and as clearly shown in Figs. 5 and 6 of the drawings.

In the upper part of this receptacle or till we provide the guide ways 53, best shown in Fig. 8, of the drawing, which slidably receive the lid or cover 54 for the receptacle or till, this lid or cover being shown in detail in Fig. 10. It is substantially rectangular in shape, having depending edge flanges 55, the front edge flange 56 being longer than the other so as to overhang the front edge of the vertical part 51 of the receptacle or till as shown in Fig. 2. On its under side this lid is provided with the longitudinally extending rack 57 which is adapted to be engaged by the gear wheel or pinion 58 secured on the end of stub shaft 59, suitably journaled within the receptacle or till, the end of which is provided with a winged recess 60 adapted to receive the wing portion 61 of the turning or operating key 62, a suitable opening 63 being provided in the side of the receptacle or till and a corresponding opening 64 being likewise provided in the side of the casing, so that the key may be inserted to rotate the gear or pinion 58 whereby the lid 54 will be moved according to the direction of rotation, as is well understood.

This lid 54 is also provided on the under side thereof with a longitudinally extending and elongated bearing member or part 65 which extends from the rear edge of the same to a point near the front end thereof where it terminates, leaving a notch or recess 66 between it and another shorter locking lug or member 67. This notch or recess 66 and members 65 and 67 are adapted to be engaged by the bolt 68 of the spring lock 69, which is suitably supported within the receptacle or till 49 along the vertical wall 51 thereof, whereby means is provided for securely holding the lid 54 in its closed position, preventing unauthorized access to the receptacle or till. This notch or recess 66 is also for the purpose of receiving the bolt 70 of the spring lock 71 which is positioned in the compartment formed by the partitions 36 and 37 and located near one wall of the main box or casing so as to hold the lid 54 in open position and to prevent the unauthorized closing of said lid.

On the under side of said lid 54, as best shown in Fig. 10, and as also seen in Fig. 8, we also provide the cam member 72 which forms an actuating means for the upwardly extending end 73 of the bar 74, slidably mounted in the upper part of the receptacle or till and having a substantially right angled engaging part 75 adapted to fit over and hold the bolt 68 in a released or non-engaging position under certain operating conditions, as hereinafter described. This locking bar 74 is normally forced into engaging position by means of spring 76 positioned about rod 77 which passes through the flange member 78 and engaging the right angle engaging part 75 of the locking bar 74. From the compartment within which the lock 69 is mounted, we extend the baffle or deflector plate member 79 which extends rearwardly at an angle, as best seen in Fig. 9 of the drawing, and also in Fig. 4, for the purpose of preventing coins or other articles interfering with the proper operation of the mechanism.

On top of this sliding lid 54 we provide the bearing member or abutment 80, as most clearly shown in Fig. 6 of the drawing. This abutment is in the form of a right angle, having the longitudinally extending part 81 and the laterally or transversely extending part 82 provided a locking shoulder 83. This locking shoulder 83 is adapted to be engaged by the end 84 of the locking member 85 which is slidably mounted along the side of the intermediate part of the main box or casing, as clearly shown in Fig. 4, and normally held in depressed or locking position by the spring construction 86 shown. This locking member 85 has the laterally extending engaging part 87 at its upper end, whereby the same may be released upon the engagement of the finger or extension 33 which is connected to the lid or tray 29. It is seen that when the cover or lid 54 is in open position, the locking member 85 will hold the same in that position and can only be released when the tilting plate or tray 29 is lowered or depressed to its fullest extent when the extension or finger 33 will have engaged the end 87 of the locking member 85 and retracted its locking end 84 from engagement with the locking shoulder 83 on the abutment member 80 on the top of the sliding lid 54 of the receptacle or till.

The longitudinally extending part 81 of this abutment member 80 forms a bearing for the finger or extension 32 on the tilting plate or tray 29 and is positioned in its path of movement when the lid or cover 54 is in closed position, as clearly shown in Fig. 4 of the drawing, thereby preventing any tilting movement of the plate or tray 29 when this sliding cover of the receptacle or till is in closed position.

The operation and function of the various parts of the mechanism, heretofore described, is as follows, and in making this explanation we will assume that the main box or casing 20 is empty and that the office man or party responsible for the correct installation of the receptacle or till 49 has charge of the same. The receptacle or till has been emptied and the sliding lid or cover 54 has been moved to closed position, as shown in Fig. 2 of the drawing. In doing this, however, the bolt 68 has been withdrawn, so that the locking end 75 of the locking member 74 has, due to the spring connection, moved over the bolt, so as to hold the same in a retracted position. In this condition the receptacle or till is inserted in the box or casing 20 and moved vertically to the upper limit of its movement. The knob 41 will be withdrawn so as to permit the locking members 52 to pass the locking edges 47 which are allowed to spring back into locking position, whereby the receptacle or till is supported in proper position, within the casing 20. At this stage the receptacle or till is therefore within the casing, the lid closed, but the bolt 68 depressed so that the lid may be moved. Key 62 is inserted and gear or pinion 58 rotated the proper direction and due to its engagement with the rack 57 the cover or lid 54 will be moved to the right in Fig. 4, it being recalled that the guide ways 48 in the box or casing 20 are in registration with the guide ways 53 in the upper part of the receptacle or till. It is also to be recalled that prior to this movement of the lid or cover 54 it is impossible to depress or open the plate or tray 29, due to the engagement of the extension or finger 32 with the part 81 of the abutment 80 on top of the lid or tray 54.

When this lid or tray 54 reaches the limit of its movement to the right, looking at Fig. 4, bolt 70 will engage the recess 66 in the bottom thereof and locking member 84 will engage the locking shoulder 83 of the abutment 80 on top thereof, so that the lid 54 is securely held in open position. It is also to be noted that due to the engagement of the lid with the guide ways formed along the sides of the casing 20 that it is positively impossible to withdraw the receptacle or till from the casing while the lid of the receptacle or till is in this open position, or is in any other position than entirely closed. The box is then in condition to permit the conductor or other operator having charge of the car or collection of articles or coins to operate the same, as is customary.

When it is desired to withdraw the receptacle or till it is necessary to unlock the lock 71 which will withdraw the bolt 70 from the notch 66 in the bottom of the sliding lid or cover 54 and also to depress the pivoted lid or tray 29 to the lower limit of its movement, whereby the finger or extension 33 will engage the extension 87 of locking member 85 and withdraw the locking end 84 thereof from engagement with the shoulder 83 on the abutment 80 on top of the sliding plate 54. It is not until this has been accomplished that it is possible to move the sliding lid 54 back toward its closed position by actuating the key 62, pinion 58 and engaging rack 57, as is well understood. When the lid or cover 54 has been moved to its closed position, the bolt 68 will spring into position in the notch 66 between the members 65 and 67 on the bottom of the lid, and thereby securely holding the lid against unauthorized opening movement. It is also to be noted that during the opening movement of the lid 54 that the end 73 of the locking member 74 will travel along the cam shaped member 72 and will be withdrawn from the dotted line locking position, shown in Fig. 8, to the full line release position shown in Fig. 4, at which point it will engage the side of the bolt 68, its purpose being merely to hold the bolt 68 in retracted position after the insertion of the receptacle or till within the box until the lid or cover is moved to its open position.

Attention is directed to the fact that the foregoing described construction is provided for a receptacle or till inserted in the bottom of the main box or casing. Fig. 12 illustrates a slight modification whereby the receptacle or till may be inserted from the side of the main box or casing. In this disclosure, the supporting lugs are in the form of hook members 88 adapted to engage the flange locking members 89 on the locking bar 90, which otherwise is constructed and operated in a fashion similar to locking bar 74. In this instance, it is also necessary to drop the receptacle or till downward slightly before it can be removed through the opening in the side of the main box or casing.

It is, therefore, seen that by utilizing the two key operated locks 69 and 71 that the opening and closing of the lid for the till or receptacle is always under the control of an authorized party and that the dumping plate or tray cannot be tilted until the lid of the till or receptacle is opened and that the lid cannot be closed until the dumping plate or tray has been closed, thus affording absolute security and protection of the contents of the till and main box at all times.

Having described our invention, what we claim is:—

1. A mechanism of the character described, including in combination, a main casing or body having a hopper and provided with an opening leading into an intermediate part, a tilting lid or tray for opening and closing said opening, an article-receiving till adapted to be inserted in said main body or casing below said intermediate portion thereof, said till having a sliding cover and means for locking said cover in its closed position when the till is outside of the casing; a key insertible in the casing to slide the lid or cover to open position, after the till is within the casing, and means to automatically lock the cover when the removable key has moved it to full open position.

2. A mechanism of the character described, including in combination, a main casing or body having a hopper and provided with an opening leading into an intermediate part, a tilting lid or tray for opening and closing said opening, an article-receiving till adapted to be inserted in said main body or casing below said intermediate portion thereof, said till having a sliding cover, key operated means for locking said cover in closed position when the till is outside the casing; means to unlock the cover by movement of the till into the casing; an insertible key to slide the cover to full open position when the till is within the casing and an automatically operating lock to lock the cover in open position.

3. A mechanism of the character described, including in combination, a main casing or body having a hopper and provided with an opening leading into an intermediate part, an article-receiving till adapted to be inserted in said main body or casing below said intermediate portion thereof, said till having a sliding cover, key operated means for locking said cover in closed position when the till is outside the casing; means for unlocking said cover operable by movement of the till into the casing; an insertible key to slide the cover to open position; means to automatically lock the cover in open position; a dumping lid or tray to direct articles into the open till and means connected to said dumping lid or tray for releasing said last mentioned locking means when said lid or tray is moved to extreme dumping position.

4. A mechanism of the character described, including in combination, a main casing or body having a hopper and provided with an opening leading into an intermediate part, a tilting lid or tray for opening and closing said opening, an article-receiving till adapted to be inserted in said main body or casing below said intermediate portion thereof, said till having a sliding cover, key operated means for locking said cover in closed position, key operated means for locking said cover in open position, additional means for locking said cover in open position, means connected to said dumping lid or tray for releasing said last mentioned locking means when the dumping lid or tray is moved to an extreme dumping position.

5. A mechanism of the character described, including in combination, a main casing or body having a hopper and provided with an opening leading into an intermediate part, a tilting lid or tray for opening and closing said opening, an article-receiving till adapted to be inserted in said main body or casing below said intermediate portion thereof, said till having a sliding cover and means for locking said cover in its open position and means for locking it in its closed position, a finger projecting from the axis of and rotatable with the dumping tray, arranged to move through the path of the lid to prevent dumping of said tray when the lid is closed.

6. A mechanism of the character described, including in combination, a main casing or body having a hopper and provided with an opening leading into an intermediate part, a tilting lid or tray for opening and closing said opening, an article-receiving till adapted to be inserted in said main body or casing below said intermediate portion thereof, said till having a sliding cover, means for locking said cover in its open position and means for locking it in closed position, means for preventing the dumping of said tray when the lid or cover of the till is in closed position, said means including an abutment member on said lid or cover and an extension connected to said lid or tray adapted to engage the abutment member on said lid or cover.

7. A mechanism of the character described, including in combination, a main body or casing having a hopper part leading to an intermediate portion provided with an opening thereinto, a pivotally mounted dumping plate controlling said opening, a small compartment located in one side of said main body or casing below said dumping plate, an article receiving till adapted to be inserted within the main body or casing and having one of the upper corners thereof cut out so that it will fit around said compartment, a sliding lid or cover for the top of said till, said till being provided with guide-ways therefor, guide-ways provided along the sides of said main body or casing and adapted to register with the guide ways in said till whereby the sliding lid or cover may be moved to open position and be positioned partially in the guide-ways within the till and partially in the guide-ways in the main body or casing, locking means within the till for holding the sliding lid or cover in closed position and locking means within said compartment for holding the sliding lid or cover in open position.

8. A mechanism of the character described, including in combination, a main body or casing having a hopper part leading to an intermediate portion provided with an opening thereinto, a pivotally mounted dumping plate controlling said opening, a small compartment located in one side of said main body or casing below said dumping plate, an article receiving till adapted to be inserted within the main body or casing and having one of the upper corners thereof cut out so that it will fit around said compartment, a sliding lid or cover for the top of said till, said till being provided with guide-ways therefor, guide-ways provided along the sides of said main body or casing and adapted to register with the guide-ways in said till whereby the sliding lid or cover may be moved to open position and be positioned partially in the guide-ways within the till and partially in the guide-ways in the main body or casing, locking means within the till for holding the sliding lid or cover in closed position, locking means within said compartment for holding the sliding lid or cover in open position, said locking means both being key actuated.

9. A mechanism of the character described, including in combination, a main body or casing having a hopper part leading to an intermediate portion provided with an opening thereinto, a pivotally mounted dumping plate controlling said opening, a small compartment located in one side of said main body or casing below said dumping plate, an article receiving till adapted to be inserted within the main body or casing and having one of the upper corners thereof cut out so that it will fit around said compartment, a sliding lid or cover for the top of said till, said till being provided with guide-ways therefor, guide-ways provided along the sides of said main body or casing and adapted to register with the guide-ways in said till whereby the sliding lid or cover may be moved to open position and be positioned partially in the guide-ways within the till and partially in the guide-ways in the main body or casing, locking means within the till for holding the sliding lid or cover in closed position, locking means within said compartment for holding the sliding lid or cover in open position, said locking means both being key actuated, supporting members secured to said till and adapted to project within said compartment and holding means arranged within said compartment adapted to engage said supporting members whereby the till may be supported in position prior to the opening movement of said lid or cover.

10. A mechanism of the character described, including in combination, a main body or casing having a hopper part leading to an intermediate portion provided with an opening thereinto, a pivotally mounted dumping plate controlling said opening, a small compartment located in one side of said main body or casing below said dumping plate, an article receiving till adapted to be inserted within the main body or casing and having one of the upper corners thereof cut out so that it will fit around said compartment, a sliding lid or cover for the top of said till, said till being provided with guide-ways therefor, guide-ways provided along the sides of said main body or casing and adapted to register with the guide ways in said till whereby the sliding lid or cover may be moved to open position and be positioned partially in the guide-ways within the till and partially in the guide-ways in the main body or casing, locking means within the till for holding the sliding lid or cover in closed position and locking means within said compartment for holding the sliding lid or cover in open position, means preventing the dumping of the plate when the lid or cover of the till is in closed position.

11. A mechanism of the character described, including in combination, a main body or casing having a hopper part leading to an intermediate portion provided with an opening thereinto, a pivotally mounted dumping plate controlling said opening, a small compartment located in one side of said main body or casing below said dumping plate, an article receiving till adapted to be inserted within the main body or casing and having one of the upper corners thereof cut out so that it will fit around said compartment, a sliding lid or cover for the top of said till, said till being provided with guide-ways therefor, guide-ways provided along the sides of said main body or casing and adapted to register with the guide ways in said till whereby the sliding lid or cover may be moved to open position and be positioned partially in the guide-ways within the till and partially in the guide-ways within the main body or casing, locking means within the till for holding the sliding lid or cover in closed position and locking means within said compartment for holding the sliding lid or cover in open position, additional locking means for holding the lid or cover of the till in open position and means associated with the dumping plate for releasing said additional locking means upon movement of the dumping plate to an extreme dumping position.

12. A mechanism of the character described, including in combination, a main body or casing having a hopper leading to an intermediate part and provided with an opening leading to said intermediate part, a dumping plate or tray controlling said opening, a removable article-receiving till adapted to be inserted in said main body or casing below said intermediate part thereof and having a sliding lid or cover, locking means within said till for holding the sliding lid or cover in closed position, locking means in said main body or casing for holding said lid or cover in open position and additional locking means in said main body or casing for holding said lid or cover in open position and means associated with said dumping plate or tray for releasing said last mentioned locking means when said plate or tray is moved to extreme dumping position.

13. A mechanism of the character described, including in combination, a main body or casing having a hopper leading to an intermediate part and provided with an opening leading to said intermediate part, a dumping plate or tray controlling said opening, a removable article-receiving till adapted to be inserted in said main body or casing below said intermediate part thereof and having a sliding lid or cover, locking means within said till for holding the sliding lid or cover in closed position, locking means in said main body or casing for holding said lid or cover in open position and additional locking means in said main body or casing for holding said lid or cover in open position and means associated with said dumping plate or tray for releasing said last mentioned locking means when said plate or tray is moved to extreme dumping position, said till having guide-ways for said sliding lid or cover, said body or casing also having guide-ways for said sliding lid or cover, said guide-ways being in alinement when the till is inserted within the body or casing, whereby when opened, the sliding lid or cover is positioned partly in the guide-ways in the till and partly in the guide-ways in the main body or casing so as to prevent the removal of the till from the main body or casing as long as the sliding lid or cover therefor is open to any extent at all.

14. A mechanism of the character described, including in combination, a main body or casing having a hopper and an intermediate part and an opening between said intermediate part and said hopper, a dumping plate or tray controlling said opening, an article-receiving till adapted to be inserted in said main body or casing below said intermediate part, said till having a slidable lid or cover, means for moving said lid or cover, a lock in said till for locking said lid or cover in closed position and a spring controlled means for holding said lock in non-engaging position with respect to said lid or cover.

15. A mechanism of the character described, including in combination, a main body or casing having a hopper and an intermediate part and an opening between said intermediate part and said hopper, a dumping plate or tray controlling said opening, an article-receiving till adapted to be inserted in said main body or casing below said intermediate part, said till having a slidable lid or cover, means for moving said lid or cover, a lock in said till for locking said lid or cover in closed position, a spring controlled means for holding said lock in non-engaging position with respect to said lid or cover and a cam on said cover for controlling the operation of said spring controlled means.

In testimony whereof we hereunto set our hands.

ALBERT RUEBSAMEN
WALTER L. DENNIS.